(12) United States Patent
Niedereder et al.

(10) Patent No.: US 7,220,941 B2
(45) Date of Patent: May 22, 2007

(54) REMOTE CONTROLLER AND CONTROL UNIT FOR A WELDING DEVICE

(75) Inventors: Franz Niedereder, Fischlham (AT); Gerald Pernkopf, Hinterstoder (AT); Andreas Prinz, Neuhofen an der Krems (AT)

(73) Assignee: Fronius International GmbH, Pettenbach (AT)

( * ) Notice: Subject to any disclaimer, the term of this patent is extended or adjusted under 35 U.S.C. 154(b) by 242 days.

(21) Appl. No.: 10/489,402

(22) PCT Filed: Sep. 6, 2002

(86) PCT No.: PCT/AT02/00260

§ 371 (c)(1),
(2), (4) Date: Mar. 11, 2004

(87) PCT Pub. No.: WO03/022503

PCT Pub. Date: Mar. 20, 2003

(65) Prior Publication Data
US 2004/0232128 A1 Nov. 25, 2004

(30) Foreign Application Priority Data
Sep. 12, 2001 (AT) ............................. A 1437/2001

(51) Int. Cl.
*B23K 9/10* (2006.01)

(52) U.S. Cl. ................................... 219/132; 219/130.5

(58) Field of Classification Search ................ 219/132, 219/130.1, 130.5, 136; 700/264
See application file for complete search history.

(56) References Cited

U.S. PATENT DOCUMENTS

| 5,278,390 A | 1/1994 | Blankenship |
| 5,837,968 A | 11/1998 | Rohrberg et al. |
| 6,002,104 A | 12/1999 | Hsu |
| 6,103,994 A * | 8/2000 | DeCoster et al. ........... 219/132 |
| 6,167,328 A * | 12/2000 | Takaoka et al. ............ 700/264 |
| 6,486,439 B1 * | 11/2002 | Spear et al. ................ 219/136 |

FOREIGN PATENT DOCUMENTS

| AT | 406 942 | 3/2000 |
| DE | 9301390 | 2/1993 |
| DE | 9217846 | 4/1993 |
| DE | 42 28 589 | 3/1994 |
| DE | 91 16 973 | 1/1995 |
| DE | 9415226 | 1/1995 |
| DE | 4435353 | 3/1996 |
| DE | 19602876 | 7/1997 |
| DE | 19733638 | 2/1999 |
| WO | WO0134337 | 5/2001 |

* cited by examiner

*Primary Examiner*—Clifford C. Shaw
(74) *Attorney, Agent, or Firm*—Collard & Roe, P.C.

(57) ABSTRACT

The invention relates to a multi-functional remote controller (27) for a welding apparatus and a welding current source, which remote controller can be connected to the welding apparatus and the welding current source by at least one line, the remote controller (27) having setting elements and switching elements and at least one display unit. The remote controller (27) has a memory, in particular a memory card, and at least one additional interface, in particular a USB terminal, and the various parameters, functions and/or operating modes are set and edited by a menu-driven system.

34 Claims, 5 Drawing Sheets

REMOTE CONTROLLER AND CONTROL UNIT FOR A WELDING DEVICE

CROSS REFERENCE TO RELATED APPLICATIONS

Applicants claim priority under 35 U.S.C. §119 of Austrian Application No. A 1437/2001 filed on Sep. 12, 2001. Applicants also claim priority under 35 U.S.C. §365 of PCT/AT02/00260 filed on Sep. 6, 2002. The international application under PCT article 21(2) was not published in English.

The invention relates to a multi-functional remote controller and a method of changing settings for a welding apparatus and a welding current source by means of a multi-functional remote controller.

A whole range of different ways of changing settings are known in welding technology, most of which permit only limited setting options. In many cases, it is also possible to amend or view specific operating parameters or functions on the welding apparatus which are not available using separate editing elements of the input and/or output devices. More often than not, these have to be retrieved by the user, who operates various different buttons or depresses one button several times in a system that is very complicated and can not be reviewed as a whole.

Patent specifications AT 406 942 B, DE 91 16 973 U1 and DE 92 17 846 U1, for example, disclose remote controllers for setting or editing at least one parameter, for which purpose the remote controller is placed in contact with the welding lines, in particular with a welding line and the workpiece. The inter-connected remote controller is then automatically detected by the welding apparatus, ensuring that a limited power supply is applied via the welding lines from the welding apparatus. The changes are made from the remote controller by means of a rotating wheel or a potentiometer or by means of a push button, prompting special signals to be transmitted across the welding lines to the welding apparatus, which are then evaluated in the welding apparatus to enable an adjustment to be made accordingly. With this type of remote controller, it is usually only possible to change a single welding parameter or only a limited number of parameters can be set.

A system for remotely controlling welding apparatus is also known from patent specification DE 44 35 353 C2, in which the remote controller is connected to the welding apparatus by an optical conductor. This being the case, data is transmitted by means of optical signals, which are generated in the remote controller and then have to be evaluated in the welding apparatus.

A remote controller for an automatic machine support of a welding device with a beam which can be rotated and displaced vertically and/or horizontally is known from patent specification DE 94 15 226 U1, in which data is transmitted wirelessly. The controller, which operates the motion of the automatic machine support and/or the parameters of the welding apparatus, has at least one sensor and a receiver for evaluating signals, which can be wirelessly activated by the remote controller. This remote controller has a number of switching elements and push buttons for position-adjusting purposes. There are no display elements on the remote controller, which means that the user must be in visual contact with the corresponding component in order to see the displacement when moving the welding device and the automatic machine support.

Various setting systems or methods of setting up a welding apparatus are known from patent specifications DE 42 28 589 C2, DE 197 33 638 A1 and DE 93 01 390 U1, in which appropriate setting elements and display elements are provided on a welding apparatus. In this case, at least one operating parameter is assigned to the individual setting elements. When using these setting systems and methods, it is only possible to set the specific parameter being set at any one time and other setting options have to be entered or programmed from an external control system, in particular from a computer, to which the user does not necessarily have access at all times.

Other setting methods are known in the field of welding technology, whereby the welding apparatus is not set up directly at the welding apparatus itself and instead settings can be entered from a welding component. A system of this type is disclosed in patent specification DE 196 02 876 C2, whereby a setting of the welding apparatus can be entered via a connected welding torch. A control device is provided on the welding apparatus for this purpose, so that a specific menu for a parameter can be retrieved by means of several push buttons, which can then be edited via the torch, in particular the torch push button. With this type of control system, the user must firstly retrieve a specific menu on the welding device in order to be able to edit the associated parameter from the torch. Although a whole range of parameters can be edited by retrieving different menus, it is still only possible to edit one single parameter after another via the torch, which means that a considerable amount of time is required if a large number of parameters have to be set.

The underlying objective of the invention is to propose a multi-functional remote controller, by means of which a welding apparatus can be easily controlled and operated.

This objective is achieved by the invention due to the fact that the remote controller has a memory, in particular a memory card, and at least one additional interface is provided, in particular a USB terminal, and the process of setting and editing of a whole range of parameters, functions and operating modes is menu-driven.

This objective is also achieved by the invention due to the fact that the process of setting and editing the various parameters, functions and/or operating modes is menu-driven.

According to one aspect of the present invention, there is provided a multi-functional remote controller for a welding apparatus and a welding current source, and the remote controller can be connected to the welding apparatus and the welding source by at least one line. The remote controller has setting elements and switching elements and at least one display unit, various parameters, functions and/or operating modes being set and edited by a menu-driven system, the remote controller having a memory, in particular a memory card, and at least one interface in addition to the line, in particular a USB terminal. During operation of the welding apparatus and the welding current source, the remote controller can be disconnected from the welding apparatus and the welding current source, and can be connected to another welding apparatus and welding current source, which are preferably in operation, and the memory is designed for continuous storage of settings to enable the transfer of the settings to the other welding apparatus and welding current source. Preferably, a function sequence incorporating several settings options, in particular parameters and menu items, is displayed in the form of a function curve, and corresponding setting elements, in particular left/right buttons, are provided and used to select and activate the parameters and menu items in the function curve.

This has the advantage that the menu-driven display of the parameters, functions and operating modes makes it very easy to operate and oversee the remote controller, which means that even an unfamiliar user will be able to find his way round and use the full spectrum of the welding apparatus. Another advantage resides in the fact that, because a memory medium is provided, in particular a memory card, settings can also be entered when the remote controller is not connected to the welding apparatus and the user is able to save special settings directly in the remote controller which he can then use when the remote controller is subsequently connected to a welding apparatus.

Also of advantage is a LCD screen with graphics capability as a display unit because it requires an inexpensive unit and also enables presentation of a graphic display.

If all Parameters and settings options can be set from and are available at the remote controller, all possible settings can be entered from the remote controller, dispensing with the need to enter settings directly at the welding apparatus.

The display of menu items presented in the formal of symbols advantageously makes it very easy for a user to find his way round.

Advantageously, when the remote controller or the welding apparatus is activated, a main level and a working level are available to the user, in which different tabs and menu items can be selected by means of the setting elements and switching elements. This offers a user-friendly, clearly organised user interface, which, being broken down into two levels, renders operation simple and transparent.

If the working level has sub-levels, it enables new parameters, operating modes, etc., to be added to the remote controller, without having to modify the basic structure of the user interface.

A review list for the settings of the welding apparatus is advantageously presented in the main level, and the settings cannot be entered until a menu item has been selected.

It is of advantage if the switching elements include left/right buttons for horizontal navigation, up/down buttons for vertical navigation, a wire inserting button, a gas check button, and several soft key/memory key buttons since only a limited number of switching elements is needed to operate the remote controller, thereby making it inexpensive to produce.

It is always possible to return to the main level at any time and from any menu item, thereby making the system much fore user-friendly, if a menu button is provided on the remote controller, which enables the system to be switched from each of the levels or from every menu item or table back to the main level and to a defined level or a defined tab when the switching element is activated.

To give the user the option of obtaining additional information about the selected menu item, which provides an easy means of avoiding incorrect settings, a special switching element is provided on the remote controller, in particular an information button, by means of which textual information about every menu item and tab, as well as additional parameters or actual values, can be retrieved.

The user is advantageously always able to access those menu items to which he has authorised access if an authorisation button is provided on the remote controller, and if different profiles can be set up for different users so that, when the profile has been set up the user can access only those menu items and tabs authorised by this profile and the other menu items and tabs are not displayed or are shown as disabled.

If the menu items, tabs and information structure can be extended at any time and thus adapted to customer-defined configurations or requirements, it enables the structure of the interface to be extended or adapted in an easy manner, thereby enabling the customer to customise his own interface.

It is also of advantage if, when a function or parameter is set or edited, it immediately becomes active without explicitly having to save it, because no actions are needed to effect the transmission to the welding apparatus, which gives the user the impression that he is entering the settings directly at the welding apparatus.

If the remote controller is built into the welding apparatus and can be removed from it, it also permits operation at the welding apparatus.

The objective of the invention is also achieved due to the fact that settings are entered and authorisations and profiles assigned via the remote controller, thereby giving the user access to the menu items authorised for a particular profile, depending on the user profile set from the remote controller, whilst the other menu items are masked or disabled.

The advantage of this is that a very transparent interface is always presented for a large number of authorisations, which makes for very user-friendly operation.

The objective is also achieved by the invention as a result of the fact that all parameters and settings options of the welding apparatus and the welding current source can be entered from the remote controller and the selection of different parameters, functions and/or operating modes is operated in at least two levels, in particular a main level and a working level, all of which can be presented in the form of menu items on the display system.

The objective is also achieved by the invention due to the fact that, from the remote controller or operating unit, a special switching element, in particular a help button or an information button, relating to the selected menu item or the selected tab can be operated and will immediately retrieve a help text or additional parameters or actual values.

The method of this invention may involve selection of different parameters, functions and/or operating modes in at least a main level and a working level, and these are presented on the display unit in the form of menu items and/or tabs, or the remote controller is operated using a help button or an information button and textual information or additional Parameters or actual values related to a selected menu item or selected tab are retrieved and displayed. This is of advantage because it offers a simple and user-friendly interface giving a user the option of entering from the remote controller all the same settings as those which can also be entered from the welding apparatus. Another advantage resides in the fact that the menu-driven interface enables the structure or interface to be automatically adapted to the authorisation assigned to the user.

Changes and settings are always immediately available at the welding apparatus and the welder or user is able to start the welding process at any time if, when a setting is entered or edited, the changes are transmitted to the welding apparatus without having to be explicitly saved.

Finally, It is of advantage if, when parameters functions and/or operating modes are set at the remote controller when it is not connected to the welding apparatus and welding current source, the changes are automatically stored in the remote controller and, when the remote controller is connected to the welding apparatus and welding current source, any data and changes that were stored are automatically transmitted. This enables the user to run his settings at the remote controller at any time and they will be automatically loaded into the welding apparatus when the remote controller is connected to the welding apparatus.

When the switching elements are operated, a list of different functions or sequences are preferably displayed and at least one left/right button is used for horizontal navigation and an up/down button for vertical navigation. This permits simple navigation using only a few switching elements.

When the menu button is activated, the system is advantageously able to switch from every level or from every menu item or tab back to the main level, or into a defined level or tab. This enables the user merely has to push one button to be immediately returned to a specific level or to a specific tab, significantly improving operation in systems which operate on several levels.

When a menu item or a tab is selected, specific functions are preferably assigned to the switching elements, in particular the soft key/memory key buttons. This is an advantageous approach whereby the same functions can always be selected for different tabs, thereby resulting in a very flexible interface with only a few switching elements.

The objective is also achieved by the invention due to the fact that by operating a specific combination of buttons or by operating a specific switch element, all or specific switching elements or setting elements can be disabled, thereby preventing and/or restricting operation via the remote controller or the operating unit. The advantage of this is that it prevents changes or settings from being entered inadvertently.

The objective is also achieved by the invention due to the fact that the menu items or the tabs are retrieved in an endless loop or a specific number of different menu items or tabs are retrieved one after the other, constituting the navigation system by which a menu item or a tab is selected via switching elements, in particular left/right and up/down buttons. The advantage of this is that an interface can be designed to be transparent, making it significantly more user-friendly. Another advantage is the fact that the loop system can be easily extended to include other tabs, since these merely have to be integrated in the loop.

It significantly improves operation, even of welding equipment and input and/or output devices with a fixed, predefined user if the menu items are presented on a display or front panel of the welding apparatus or on the display unit of the remote controller, or a function curve is presented on the front panel, for which several parameters or menu items are set, and corresponding left/right buttons are provided and used as a means for horizontally navigating the function curve in order to select and activate the Parameters and menu items in the function curve, and the region of the function curve is shown by a LCD display and the rest of the structure of an input and/or output device presents displays of fixed Parameters and menu items.

The invention will be described in more detail with reference to examples of embodiments.

Of the drawings.

Firstly, it should be pointed out that the same parts, modes and menu items are denoted by the same reference numbers in the various examples of embodiments.

Figure 1:
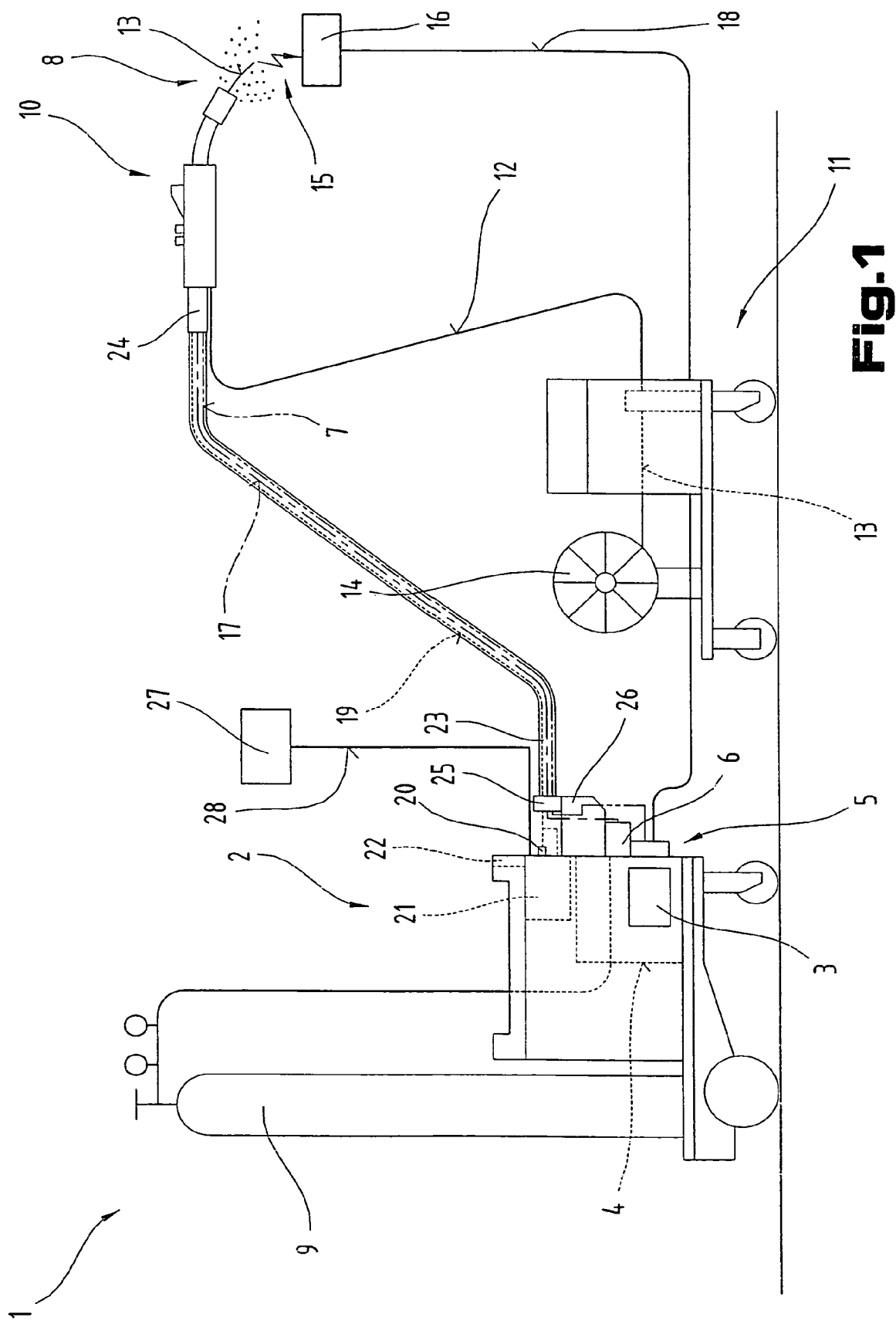
FIG. 1 is a schematic diagram of a multi-functional cutting and/or welding apparatus as proposed by the invention.

FIG. 1 illustrates a welding system and a welding apparatus 1, which is connected to or has an integrated component as proposed by the invention. The welding system or welding apparatus 1 can be used for a whole range of welding processes, e.g. MIG-MAG welding and WIG/TIG welding or electrode welding processes, etc. Clearly, the solution proposed by the invention may be used with a current source or a welding current source.

The welding apparatus 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, inter-connecting a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device as illustrated in FIG. 1.

The current needed to strike an arc 15 between the welding wire 13 and a workpiece 16 is fed via a supply line 17 from the power component 3 of the current source 2 to the welding torch 10 and the welding wire 13, the workpiece 16 to be welded also being connected to the welding apparatus 1, in particular to the current source 2, via another supply line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding apparatus 1 also has an input and/or output device 22, by means of which a whole range of settings can be entered for welding parameters and operating modes of the welding apparatus 1. The welding parameters entered at the input and/or output device 22 are then forwarded to the control system 4, from where they are applied to the individual components of the welding system and the welding apparatus 1.

In the embodiment illustrated as an example here, the welding torch 10 is also connected to the welding apparatus 1 and the welding system by means of a hose pack 23. The individual lines from the welding apparatus 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding apparatus 1 by means of connecting sockets and plug connectors. To relieve tension on the hose pack 23, the hose pack 23 is connected via a tension-relieving device 25 to a housing 26, in particular the basic housing of the welding apparatus 1.

As also illustrated in FIG. 1, the component proposed by the invention in the embodiment illustrated as an example here is a multi-functional remote controller 27, which is connected to the welding apparatus via lines 28. Naturally, this remote controller 27 could also be designed specifically as an operating unit or input and/or output device 22 for a welding apparatus 1, in which case this operating unit or input and/or output device would be integrated in the welding apparatus 1. The functions and operating sequences in the example described as an embodiment here correspond to the multi-functional remote controller 27.

Figure 2:
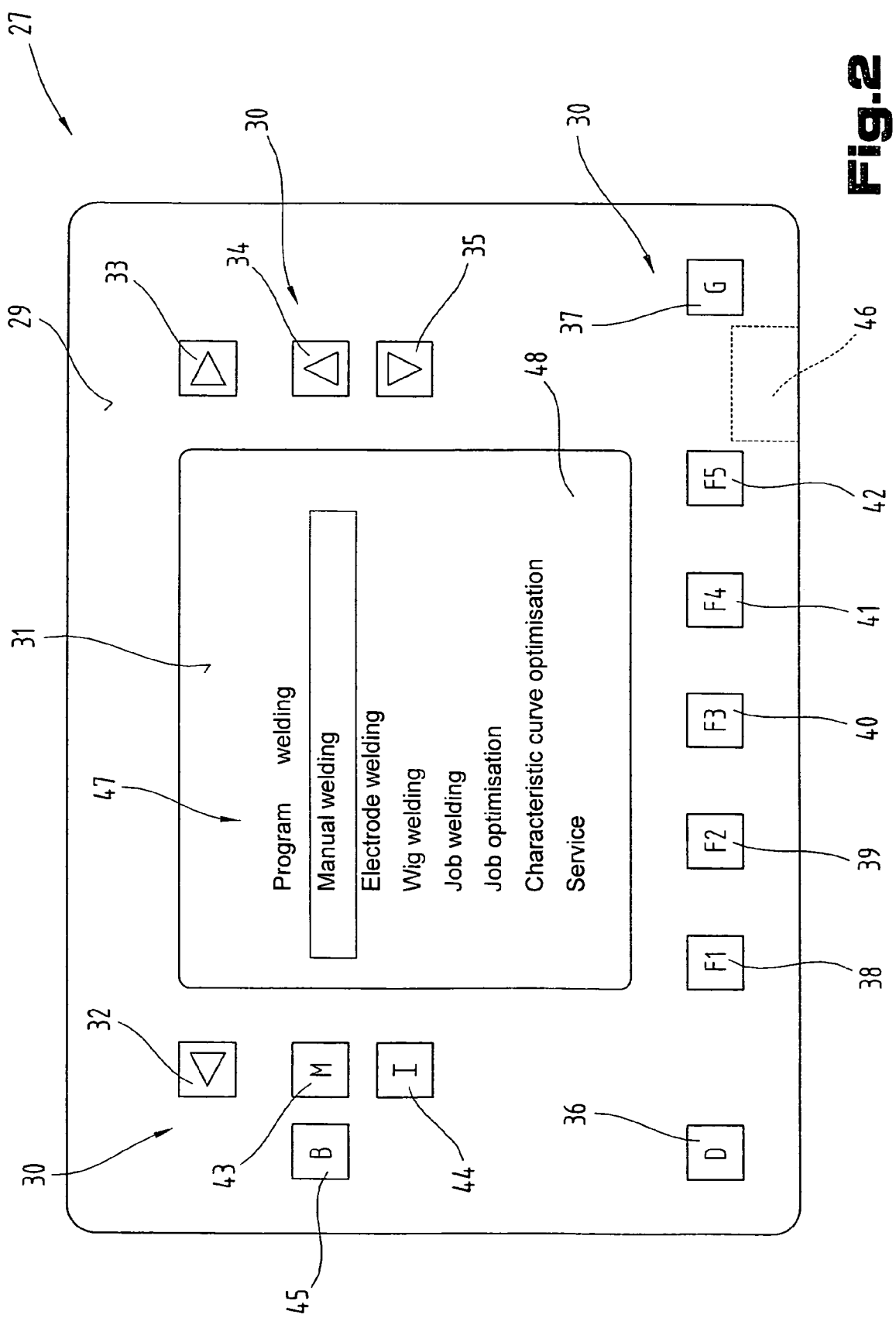
FIG. 2 is a schematic diagram of the remote controller with the display unit presenting the first level, in particular the main level.
Figure 3:
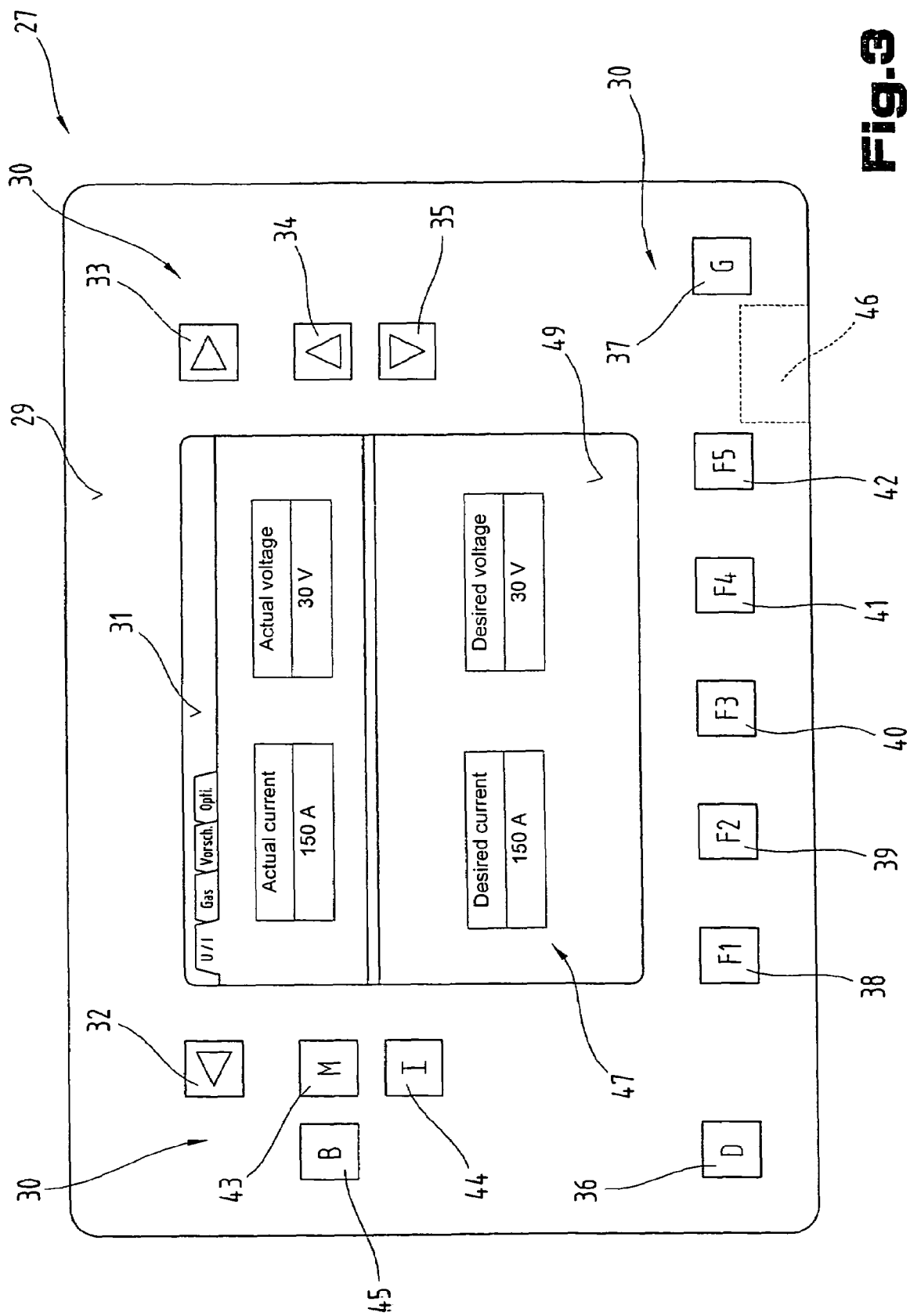
FIG. 3 is another schematic diagram of the remote controller with the display unit showing the second level, in particular the working level.
Figure 4:
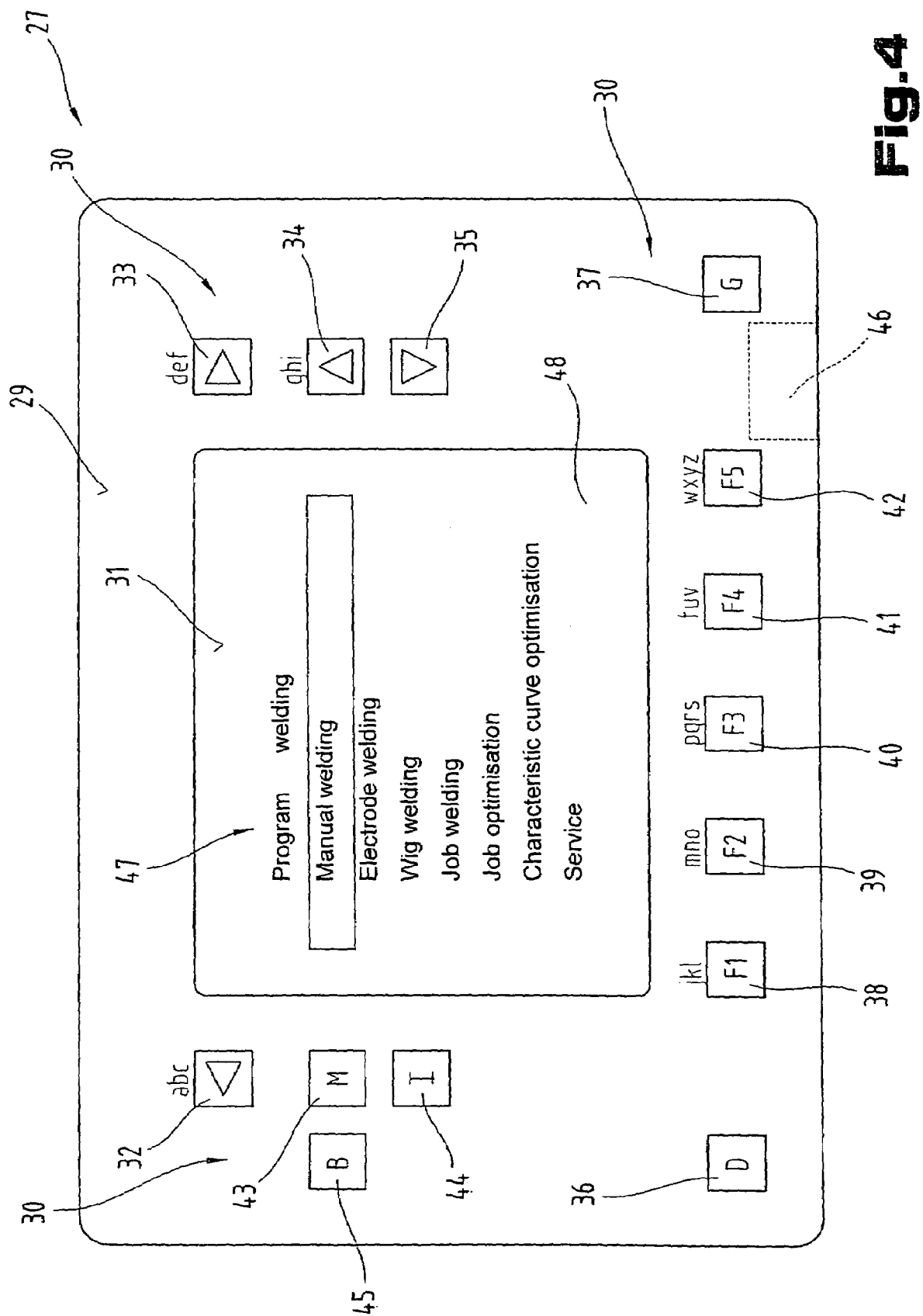
FIG. 4 shows another embodiment of the remote controller.

FIGS. 2 to 4 provide detailed illustrations of the multi-functional remote controller 27 for a welding apparatus 1 and a welding current source 2, from which a user can enter settings for all parameters, functions and operating modes.

FIGS. 1–4 will be described in conjunction with one another. The multi-functional remote controller 27 has a housing 29 incorporating several setting elements or switching elements 30 in the form of push buttons, and a display element 31, which is a LCD screen. The switching elements are configured in such a way that one or more functions are assigned to them. Naturally, it would also be possible for other known setting elements to be provided, such as an incremental transmitter, for example. The remote controller 27 preferably has a left/right button 32, 33 for horizontal navigation, an up/down button 34, 35 for vertical navigation, a wire inserting aid button 36, a gas check button 37, and several, in particular five, soft key/memory key buttons 38 to 42. Other special switching elements 30 are also provided on the remote controller 27, in particular a menu button 43, an information button 44 and an authorisation button 45.

The multi-functional remote controller 27 also has a memory, in particular a memory card, although this is not illustrated. At least one interface 46, in particular a USB terminal, indicated by broken lines, is provided on the remote controller 27, enabling appropriate components and devices with a complementary connector to be connected so that they can also be activated via the multi-functional remote controller 27. In order to make it possible to control the welding apparatus 1 and the welding current source 2 at all, the multi-functional remote controller 27 is connected via at least one line 28 to the welding apparatus 1 and to the welding current source 2. Naturally, other types of connection systems known from the prior art could also be used, such as optical conductors or radio, for example, in which case the requisite components will be disposed in the housing 29 of the remote controller 27 and the welding apparatus 1. In another embodiment, an operating unit is provided in the form of a remote controller 27 of the same design as that described above but with the difference that the operating unit is integrated in the welding apparatus 1 so that a connecting line can be dispensed with or the operating unit is connected to the control system 4 of the welding apparatus 1. Since the functions and the structure of the operating unit are the same as the remote controller 27, a separate description of the operating unit will not be given.

With the remote controller 27 and the operating unit proposed by the invention, any data set at the remote controller 27 or operating unit is transmitted immediately it is entered, i.e. when a function or a parameter is edited or set, the changes become effective immediately without explicitly having to save them. Naturally, it would also be possible for the data to be compiled or stored in the remote controller 27 or operating unit initially and then transmitted to the welding apparatus 1 as a data packet.

The remote controllers 27 is supplied with power via the connection, in particular the lines 28, from the welding apparatus 1, whereas the operating unit is directly connected to the internal power system of the welding apparatus 1. This being the case, a separate power source may be provided in the remote controller 27, for example in the form of batteries or accumulators or an integrated network, or alternatively the remote controller 27 can be connected to a separate power supply, in particular a network device. The fact that the remote controller 27 is powered separately means that the remote controller 27 can also be operated without welding apparatus 1 or another component.

All parameter and settings options of the welding apparatus 1 and the welding current source 2 which can be entered in respect of the welding apparatus 1 from an input and/or output device 22 co-operating with a welding apparatus 1 known from the prior art, as well as other internal parameters or functions, can be set from and are available at the remote controller 27. The actual values for the individual parameters detected whilst the welding apparatus 1 is performing a welding process can also be indicated on the remote controller 27 and even displayed, i.e. in diagrams. The parameters and settings options are selected in the form of menu items 47, which are presented on the display unit 31 in a user-friendly format of symbols and texts.

When the remote controller 27 is switched on, at least two levels are available to the user, in particular a main level 48 and a working level 49, as schematically indicated in FIG. 2—main level 48—and FIG. 3—working level 49—with different menu items 47 being available in each level, which can be selected by means of the setting elements. Naturally, the working level 49 may well have other sub-levels.

In order to make the system very user-friendly, one or more tabs are provided in the various levels, in which the menu items 47, in particular the parameters, functions and/or operating modes of the welding apparatus 1 are displayed, so that they can be duly selected and set, as illustrated in FIG. 3, where four tabs are shown. The user merely has to select a tab, which will then be presented in the foreground showing the individual settings options, i.e. the tabs and the menu items are retrieved in an endless loop or a specific number of different menu items or tabs are retrieved one after the other, in which case the switching elements 30, in particular left/right buttons 32, 33 or up/down buttons 34, 35 are used to navigate in order to select a menu item or a tab. It is preferable for the tabs to be presented in a horizontal layout, i.e. several tabs are arranged one after the other, with each tab visible in the top region of the display unit 31 occupying a part region in which a symbol or a text appears, so that the user can select any tab, as schematically illustrated in FIG. 3. As a result, the user is able to find his way round very easily, because he can see at a glance in which tab he is and how many of them there are in this level overall. He will therefore be able to recognise the different levels at a glance.

In the first level, in particular the main level 49, The work actions such as the menu items 47 "Welding programme", "Manual welding", "Electrode welding", "WIG welding", "Job welding", "Optimise job", "Optimise characteristics", "Service", are disposed in the first level, in particular the main level 49, these menu items 47 being listed under one tab or alternatively each having a separate tab. These menu items 47 are presented vertically, one underneath the other, and can be selected by the up/down buttons 34, 35. In order to activate them, the user must operate a corresponding switching element 30, in particular one of the soft key/memory key buttons 38 to 42, which will prompt a display of the second level—the working level 49—on the display unit 31. The associated parameters, lists of values, functions, etc., are contained in the second level, in particular in the working level 49, and may be distributed amongst several tabs. These are in turn shown by individual menu items 47, for example in the form of symbols. The individual menu items 47 or tabs are selected by means of the left/right buttons 32, 33, and when a menu item 47 is selected, the associated parameters and settings options will be automatically displayed on the display unit 31. In order to get into these parameters and settings options, it is merely necessary to select them using the up/down buttons 34, 35.

To assist the user as far as possible, the two switching elements 30, menu button 43 and information button 44, are provided. When the menu button 43 is activated, it is possible to move back from any level and from any menu item 47 to the initial level, in particular the first level—main level 48—or to a defined tab. If, on the other hand, the switching element 30, in particular the information button 44, is activated, a text containing information about the menu item 47 previously selected will appear, containing a description of the selected parameter or function, for example.

If the menu item 47 "Welding programme" is selected, different welding process for robot welding systems are stored in the working level 49 and can be edited accordingly. When this menu item 47 is retrieved, additional components on the welding apparatus 1 are activated, for example, which are necessary in order to exchange data with a robot or other external devices.

The menu item 47, manual welding, contains all the parameters that are available as standard on a modern welding apparatus 1. The user can set up separate welding processes using this menu item 47.

The menu items 47, "Electrode welding" and "WIG welding", correspond to standard processes known from the prior art. The difference as compared with the welding apparatus 1 known from the prior art resides in the fact that all settings options and parameters are presented in a review format as menu items 47 and no longer have to be set using mechanical settings means on the welding apparatus 1.

From the menu item 47, Welding job, the user can store his own welding process. The menu items 47 "Optimise job" and "Optimise characteristics" are used to edit previously stored or recorded curve formats.

From the multi-functional remote controller 27 or the operating unit, different users with different profiles can be set up directly on the remote controller 27 or the operating unit, and in order to set up the user profiles in the main level 48, it is necessary to retrieve the menu item 47 "Service", so that the corresponding authorisations for the individual menu items 47 and/or tabs can then be authorised in the working level 49 or a user assigned to a predefined profile previously set up. The task of setting up profiles is preferably protected by a password or a code, in order to prevent unauthorised access.

Once the authorisations have been allocated, the user will then have a set profile and will be able to access only the menu items 47 authorised for this profile, whereas the other disabled menu items 47 will be masked or will be not be displayed or will be shown as disabled. This simplifies operation of the remote controller 27 because the user will only be able to operate those menu items 47 to which his profile gives him access. To enable the multi-functional remote controller 27 or the operating unit to activate the set profile of the user, it will be necessary to operate the authorisation button 45 to log on first when the remote controller 27 or welding apparatus is activated, in other words in operation.

Using the remote controller 27 means that it is no longer necessary to provide an input and/or output device 22 or operating unit on the welding apparatus or only the most necessary setting elements for the most important parameters need be provided, because all settings can be entered from the remote controller 27. This reduces the cost of the welding apparatus 1 and also enables simple welding processes to be set up and run, even without the remote controller 27.

It is also possible to disconnect the remote controller 27 whilst the welding apparatus 1 or the welding current source is in operation and connect it to another welding apparatus 1 that is currently in operation or a welding current source 2 that is currently in operation, and the last settings entered at the remote controller 27 will continue to be stored and can thus be easily transferred. By adopting this approach, therefore, several pieces of welding apparatus 1 can be set up using the same remote controller 27 whilst having to enter the settings once only.

As result of the graphic presentation of the settings options, the menu items 47 and the help structure can be very easily extended from the remote controller 27 or operating unit at any time. For example, it is very easy to adapt the remote controller 27 or the operating unit to customer-defined requirements or configurations by appropriate programming. Another option is for the user to compile his own interface from a range of tabs and menu items 47. The user can do this, for example, by selecting a parameter, a function or an operating mode and then operating a switching element 30, in particular one of the soft key/memory key buttons 38 to 42, so as to copy the selected parameter or the selected function or operating mode to a user page, in other words a tab. The user can therefore compile all the different settings options which he needs most frequently on a page or tab specifically designated for him.

It should be pointed out that the data transmission from the remote controller 27 to the welding apparatus 1 and from the operating unit to the control system 4 and vice versa takes place via a field bus. Another option for identifying users is to use various detection systems, such as a transponder system, a chip card system, fingerprint sensors, etc.

The remote controller 27 and the welding apparatus 1 incorporating the operating unit may also be connected to a computer or laptop, in which case the settings can initially be entered on the computer or laptop, after which these settings can then be downloaded via the computer or laptop to the remote controller 27 and the welding apparatus 1. By using the remote controller 27, when the remote controller 27 is connected to the welding apparatus 1, these settings are then transferred to and become active at the welding apparatus 1. The computer or laptop does not have to be connected to the welding apparatus 1 to do this because special welding processes are simply programmed on the computer or laptop and then can simply be downloaded onto the readily portable remote controller 27.

Another option is to make provision for the use of text fields. To this end, the individual switching elements 30 are assigned corresponding letters so that the user can select these different letters by operating these switching elements 30 several times. The fact that the switching elements have to be switched from their default function to alphabetic mode is automatically detected. To this end, the user merely has to select a specific text field, which will prompt the remote controller 27, in particular a control system contained in it, to switch the switching elements 30 to alphabetic mode, thereby enabling free text to be entered. This provides a simple means of enabling a password to be entered, for example, or different settings can be accompanied by a text or observations. An example of this type is illustrated in FIG. 4. This approach also makes for transparent management of the stored settings and saved welding processes because the user is able to characterise or describe them accordingly. Naturally, it would also be possible to provide separate switching elements 30, not illustrated, specifically for inputting text or to connect an add-on device such as a keyboard, for example.

In another possible option, when the remote controller 27 is connected to the welding apparatus 1, a scan may be performed first of all to enable the remote controller 27 to adapt the possible functions, in particular the menu items 47, for the welding apparatus 1, i.e. by setting up a data exchange, in which case the welding apparatus 1 will transmit an appropriate code to the remote controller 27, enabling a corresponding structural adaptation, in other words editing the possible menu items 47, tabs and/or graphic presentation. This scanning process enables a remote controller 27 or an operating unit to be used with a whole range of different types of welding apparatus 1, whereby only those menu items 47 and/or tabs that are used with this particular welding apparatus 1 will ever be displayed on the remote controller 27 or on the operating unit, i.e. the remote controller 27 and the welding apparatus 1 together with the operating unit will adapt the interface, tabs and menu items 47 depending on the welding apparatus type or welding current source type that is connected.

Naturally, another possibility would be for the multifunctional remote controller 27 or the operating unit to be configured so that instead of the main menu or the main level 48, switching elements, not illustrated, in particular fix buttons, are provided so that when one of these switching elements—fix buttons—is operated, the system moves directly to the working level 49, i.e. all or some of the menu items in the main menu or in the main level are operated at the welding apparatus 1 or at the remote controller 27 or the operating unit by means of the fix buttons or are assigned to them. This will enable the main level 48 to be dispensed with and the user can go straight to the working level 49 by operating a fix button, and then enter all the settings.

In the examples of embodiments described above, there are various ways of navigating the different levels described. Navigation in the first level is horizontal, whereas navigation in the second level and in any other level is effected between horizontally displayed tabs. It would naturally be possible to operate the navigation system the other way round. If, on the other hand, only one level is used, in which several tabs are displayed, it is preferable to opt for horizontal navigation.

Another possibility available from the examples of embodiments described above is that on selecting a tab or a menu item, specific functions, such as save, replace, transmit, confirm, etc., can be assigned to the switching elements 30, the soft key/memory key buttons 38 to 42, enabling this function to be retrieved when the corresponding button(s) 38 to 42 is/are operated. This makes for a very flexible system because only those functions which are possible from this tab are displayed or retrieved.

Figure 5:
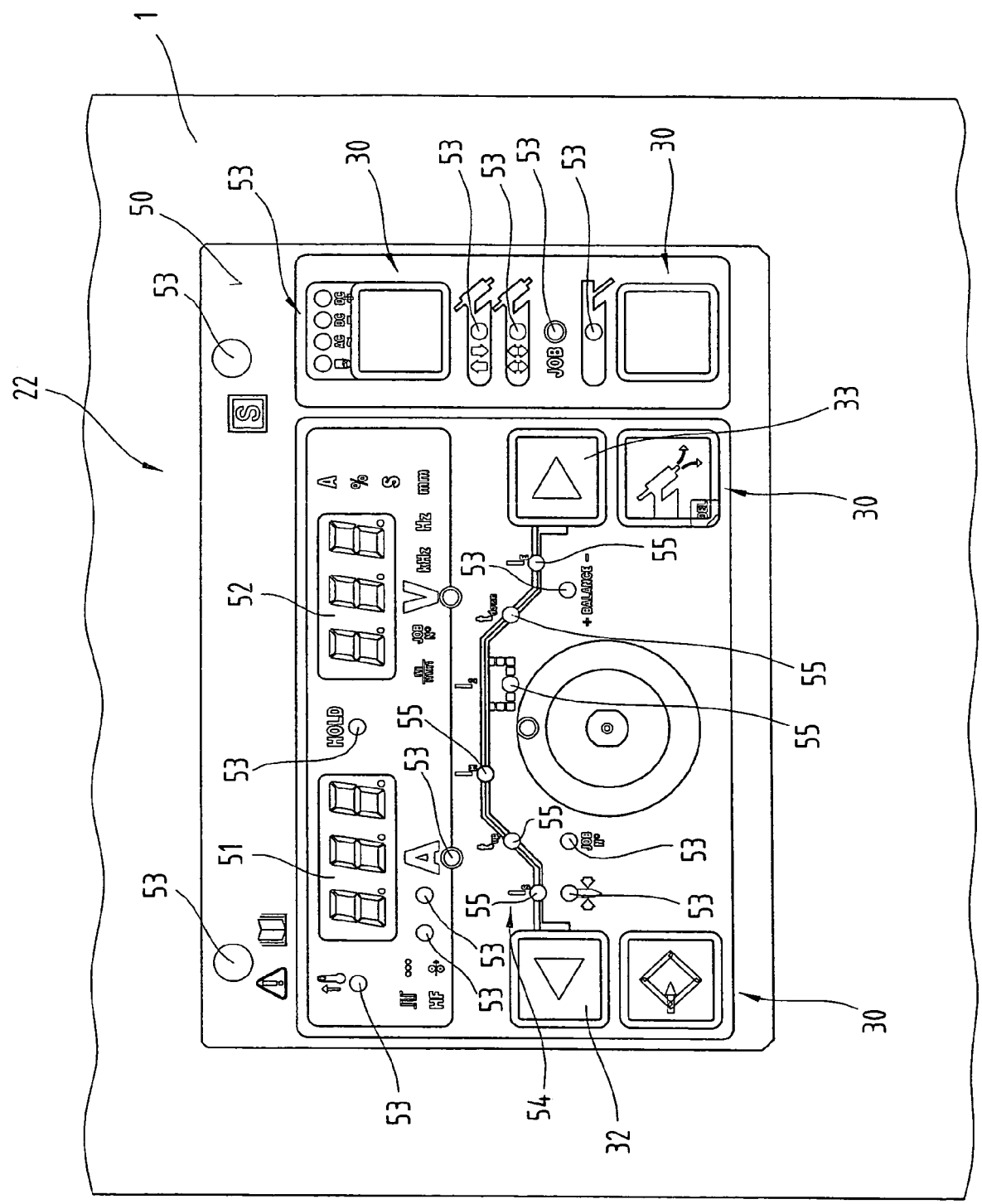
FIG. 5 illustrates another embodiment for setting up a welding apparatus.

FIG. 5 illustrates another example of an embodiment designed to operate a welding apparatus 1, whereby operation of the welding apparatus takes place directly at the welding apparatus 1 and not via the remote controller 27 or a corresponding integrated operating unit, as was the case with the embodiments described above.

A standard input and/or output device 22 is used with the welding apparatus 1 illustrated here, provided in the form of a front panel 50, on which the setting elements and switching elements 30 for the various parameters and menu items are disposed. The front panel 50 also has at least one, preferably two, integrated 7-segment displays 51, 52, by means of which values, in particular the actual values and desired values, of the individual parameters and menu items are displayed. In the embodiment illustrated as an example here, a whole range of functions and settings options are presented on the front panel 50 in the form of symbols or texts, and these or several associated settings options are assigned to one display element, in particular one lightemitting diode 53 to enable the parameters to be selected or chosen when the corresponding light-emitting diode 53 is activated.

The main difference which this embodiment has over the embodiments described in connection with FIGS. 1 to 4 is that the settings options in this case, in particular some of the parameters and menu items, are provided separately on the front panel, whereas the settings options in the embodiments described above are displayed on the display unit, thereby enabling the display presented on the display unit to be varied by changing level or selecting a tab.

Also in this embodiment, a functional sequence in the form of a functional curve 54 is presented on the front panel 50 and several settings options are available for this functional curve, in particular parameters and menu items. These parameters and menu items which can be entered include, for example, the different points of the function curve 54 which can be set and displayed with other light-emitting diodes 55, enabling the duly selected actual and/or desired values to be displayed on the 7-segment displays 51, 52.

In order to make the interface user-friendly, another option which is possible with this type of input and/or output device 22 is to use the solution proposed by the invention whereby horizontal navigation is used for functional sequences and function curves 54 of this type. Naturally it would also be possible to operate a functional sequence by vertical navigation if the appropriate facilities were provided. A system of horizontal navigation of the function curve 54 could be configured so that corresponding setting elements, in particular the left/right buttons 32, 33, are used to select and activate the parameters and menu items in the function curve 54. It will then be possible to switch from one parameter or menu item to the next parameter or menu item by operating one of these left/right buttons 32, 33 so that the light-emitting diode 55 selected for the parameter or menu item currently selected is activated, i.e. the menu items and the parameters are retrieved in an endless loop or a specific number of different menu items or parameters is retrieved one after the other, so that the switching elements 30, in particular the left/right buttons 32, 33, can be used to navigate to and select a menu item or a parameter. The left/right buttons 32, 33 will enable the user to navigate horizontally in both directions.

Naturally, this functional sequence or the function curve 54 could also be integrated and displayed in a tab in the embodiments illustrated in FIGS. 1 to 4, thereby enabling a welding apparatus 1 of this type to be used via the remote controller 27 or the operating unit illustrated in FIGS. 1 to 4. By adopting this operating approach, it would also be possible to use a fixed combination of listed parameters and menu items with a display unit 31 (see FIGS. 2 to 4), in particular a LCD display, in which case it would be possible to retrieve several such functional sequences or function curves 54, which will then be presented on the LCD display, i.e. the region of the function curve 54 could be shown in a LCD display and the rest of the structure of the input and/or output device 22 could be operated on the basis of fixed parameters and menu items. The advantage of this design is that a much smaller and hence less expensive LCD display can be used, which also secures a very high degree of flexibility, because a plurality of different function curves 54 can be displayed. It would naturally also be possible to retrieve other settings options on this LCD display, enabling yet other parameters and menu items to be set.

As another option, it would also be possible to integrate an input lock or key lock in the embodiments described in connection with FIGS. 1 to 5, i.e. when the input lock or the key lock is activated no input or changes can be made at the remote controller 27 or the operating unit or the input and/or output device 22. This will not be possible again until the user releases the key lock. This approach prevents any inadvertent changes from being made. The key lock can be configured in such a way that when a specific key combination of several switching elements 30 is entered or when a specific switching element 30 is operated, all or specific switching elements 30 or setting elements are disabled, thereby preventing and/or restricting operation via the remote controller 27 or the operating unit and the input and/or output device 22.

This input lock or this key lock could also be automatically enabled. This may be operated in such a way that the input lock or key lock is activated if a specific pre-set period elapses during which no entries are made, thereby preventing any inadvertent changes, because the user must first consciously release the key lock.

The display unit 31 could also be provided in the form of a touch screen, in which case a menu item or a tab or functions and parameters will be selected by lightly touching the display unit 31. Using a touch screen of this type will mean that all or some of the switching elements 30 can be dispensed with and navigation will be effected simply by touching the screen. One or all of the switching elements could then be presented on the screen in the form of symbols.

Finally, it should be pointed out that individual states and illustrations of the examples of embodiments described above are illustrated disproportionately in order to provide a clearer understanding of the solution proposed by the invention.

LIST OF REFERENCE NUMBERS

1 Welding apparatus
2 Current source
3 Power component
4 Control system
5 Switching element
6 Control valve
7 Supply line
8 Gas
9 Gas storage
10 Welding torch
11 Wire feed device
12 Supply line
13 Welding wire
14 Supply reel
15 Arc
16 Workpiece
17 Supply line
18 Supply line
19 Cooling circuit
20 Flow indicator
21 Water container
22 Input and/or output device
23 Hose pack
24 Connector device
25 Tension-relieving device
26 Housing
27 Remote controller
28 Line
29 Housing
30 Switching element
31 display unit
32 left button
33 right button
34 up button
35 down button
36 wire insert aid button
37 gas check button
38 soft key/memory key button
39 soft key/memory key button
40 soft key/memory key button
41 soft key/memory key button
42 soft key/memory key button
43 menu button
44 info button
45 authorisation button
46 interface
47 menu item
48 main level
49 working level
50 front panel
51 7-segment display
52 7-segment display
53 light-emitting diode
54 function curve
55 light-emitting diode

The invention claimed is:

1. Multi-functional remote controller for a welding apparatus and a welding current source, which remote controller can be connected to the welding apparatus and the welding current source by at least one line, the remote controller having setting elements and switching elements and at least one display unit, various parameters, functions and/or operating modes being set and edited by a menu-driven system, the remote controller having a memory, in particular a memory card, and at least one interface in addition to the line, in particular a USB terminal, and, during operation of the welding apparatus and the welding current source, the remote controller can be disconnected from the welding apparatus and the welding current source and can be connected to another welding apparatus and welding current source, which are preferably in operation, and the memory is designed for continuous storage of settings to enable the transfer of the settings to the other welding apparatus and welding current source.

2. Remote controller as claimed in claim 1, wherein a function sequence incorporating several settings options, in particular parameters and menu items, is displayed in the form of a function curve, and corresponding setting elements, in particular left/right buttons, are provided and used to select and activate the parameters and menu items in the function curve.

3. Remote controller as claimed in claim 2, wherein the menu items, tabs and information structure can be extended at any time and thus adapted to customer-defined configurations or requirements.

4. Remote controller as claimed in claim 1, wherein the display unit is a LCD screen, in particular a LCD screen with graphics capability.

5. Remote controller as claimed in claim 1, wherein all parameters and settings options for the welding apparatus and the welding current source can be set from and are available at the remote controller.

6. Remote controller as claimed in claim 1, wherein the selection of different parameters and settings options is displayed in the form of menu items.

7. Remote controller as claimed in claim 1, wherein when the remote controller or the welding apparatus is activated, a main level and a working level are available to the user, in which different tabs and menu items can be selected by means of the setting elements and switching elements.

8. Remote controller as claimed in claim 7, wherein the working level has additional sub-levels.

9. Remote controller as claimed in claim 7, wherein the individual work activities, such as programme welding, manual welding, electrode welding, WIG welding, job welding, job optimisation, characteristic curve optimisation, service, are disposed in the main level.

10. Remote controller as claimed in claim 7, wherein associated parameters, lists of values and functions are disposed in the working level.

11. Remote controller as claimed in claim 7, wherein a special switching element, in particular a menu button, is provided on the remote controller, which enables the system to be switched from each of the levels or from every menu item or tab back to the main level and to a defined level or a defined tab, when the switching element is activated.

12. Remote controller as claimed in claim 7, wherein a special switching element is provided on the remote controller, in particular an information button, by means of which textual information about every menu item and tab can be retrieved.

13. Remote controller as claimed in claim 12, wherein additional parameters or actual values can be retrieved with the special switching element.

14. Remote controller as claimed in claim 1, wherein the switching elements include left/right buttons for horizontal navigation, up/down buttons for vertical navigation, a wire inserting aid button, a gas check button, and several, in particular five, soft key/memory key buttons.

15. Remote controller as claimed in claim 1, wherein an authorisation button is provided on the remote controller.

16. Remote controller as claimed in claim 1, wherein different profiles can be set up for different users.

17. Remote controller as claimed in claim 16, wherein when the profile has been set up, the user can access only those menu items and tabs authorised by this profile and the other disabled menu items and tabs are not displayed or are shown as disabled.

18. Remote controller as claimed in claim 1, wherein when a function or a parameter is set or edited, it immediately becomes active without explicitly having to save it.

19. Remote controller as claimed in claim 1, wherein the remote controller is built into the welding apparatus and can be removed from it.

20. Method of setting up a welding apparatus and a welding current source by means of a multi-functional remote controller as claimed in claim 1, wherein various parameters, functions and/or operating modes for the welding apparatus can be set and different authorisations allocated to the different users by means of the remote controller, wherein the authorisations and profiles are set up and allocated via the remote controller and, when the profile has been set up, the user can access only those menu items and data authorised for this profile, and disabled menu items are not displayed or are shown as disabled.

21. Method as claimed in claim 20, wherein when a setting is entered or edited, the changes are transmitted to the welding apparatus without having to be explicitly saved.

22. Method as claimed in claim 20, wherein if parameters, functions and/or operating modes are set at the remote controller when it is not connected to the welding apparatus and welding current source, the changes are automatically stored in the remote controller.

23. Method as claimed in claim 22, wherein when the remote controller is connected to the welding apparatus and the welding current source, any data and changes that were stored are automatically transmitted.

24. Method as claimed in claim 20, wherein when the switching elements are operated, a list of different functions or sequences is displayed and at least one left/right button is used for horizontal navigation and an up/down button for vertical navigation.

25. Method as claimed in claim 20, wherein when the menu button is activated, the system is able to switch from every level or from every menu item or tab back to the main level, or into a defined level or tab.

26. Method as claimed in claim 20, wherein the first level is operated by vertical navigation, whereas the second level and all other levels are operated by horizontally navigating between the individual tabs.

27. Method as claimed in claim 20, wherein when a menu item or a tab is selected, specific functions are assigned to the switching elements, in particular the soft key/memory key buttons.

28. Method of setting up a welding apparatus and a welding current source via a multi-functional remote controller, as claimed in claim 1, whereby various parameters, functions and/or operating modes of the welding apparatus can be set via the remote controller, wherein all parameters and settings options of the welding apparatus and the welding current source are set by the remote controller and the selection of different parameters, functions and/or operating modes is made in at least one level but preferably two levels, in particular a main level and a working level, and these are presented on the display unit in the form of menu items and/or tabs.

29. Method of setting up a welding apparatus and a welding current source by means of a multi-functional remote controller, as claimed in claim 1, whereby various parameters, functions and/or operating modes for the welding apparatus, in particular for a welding process, are set by the remote controller, wherein when the remote controller is operated using a special switching element, in particular a help button or an information button, and textual information or additional parameters or actual values relating to a selected menu item or the selected tab are retrieved and displayed.

30. Method of setting up a welding apparatus and a welding current source via a multi-functional remote controller, wherein parameters, functions and/or operating modes for the welding apparatus, in particular for a welding process, are set via the remote controller, wherein when a specific combination of buttons is operated, all or specific switching elements and setting elements are disabled and operation via the remote controller is therefore prevented and/or restricted.

31. Method of setting up a welding apparatus as claimed in claim 30, wherein menu items and tabs are retrieved in an endless loop or a specific number of different menu items or tabs is retrieved one after the other, a menu item or tab being selected by navigation using switching elements, in particular left/right and/or up/down buttons.

32. Method as claimed in claim 31, wherein the menu items, in particular special parameters, are presented on a display or a front panel of the welding apparatus or on the display unit of the remote controller.

33. Method as claimed in claim 31, wherein a function sequence, in particular a function curve, is presented on the front panel, for which several parameters or menu items are set, and corresponding left/right buttons are provided and used as a means of horizontally navigating the function curve in order to select and activate the parameters and menu items in the function curve.

34. Method as claimed in claim 33, wherein the region of the function curve is shown by a LCD display and the rest of the structure of an input and/or output device presents displays of fixed parameters and menu items.

* * * * *